United States Patent [19]

Inoue et al.

[11] 4,392,141

[45] Jul. 5, 1983

[54] IMAGE FORMING METHOD

[75] Inventors: Eiichi Inoue, Tokyo; Yasushi Takatori, Machida; Masahiro Haruta, Funabashi, all of Japan

[73] Assignee: Canon Kabushiki Kaisha, Toyko, Japan

[21] Appl. No.: 263,608

[22] Filed: May 14, 1981

Related U.S. Application Data

[63] Continuation of Ser. No. 99,889, Dec. 3, 1979, which is a continuation of Ser. No. 902,409, May 3, 1978, abandoned.

[30] Foreign Application Priority Data

May 16, 1977 [JP] Japan .................................. 52-56193
May 16, 1977 [JP] Japan .................................. 52-56194

[51] Int. Cl.³ ........................ G01D 9/00; G01D 15/10; G01D 15/34

[52] U.S. Cl. .................................. 346/1.1; 346/76 R; 346/135.1

[58] Field of Search ........................ 346/1, 76 R, 135.1

[56] References Cited

U.S. PATENT DOCUMENTS

| | | | |
|---|---|---|---|
| 3,891,513 | 6/1975 | Yasumori et al. | 346/76 R X |
| 3,905,876 | 9/1975 | Yoshino et al. | 346/76 R X |
| 3,971,874 | 7/1976 | Ohta et al. | 346/76 R X |
| 4,106,939 | 8/1978 | Chang et al. | 346/135.1 X |

FOREIGN PATENT DOCUMENTS 1275929 6/1972 United Kingdom .

*Primary Examiner*—George H. Miller, Jr.
*Attorney, Agent, or Firm*—Fitzpatrick, Cella, Harper & Scinto

[57] ABSTRACT

An image forming method comprises a first process step of introducing a thermal or electrical information into a recording medium as an input thereto, and converting said information into an absorption pattern of radiation rays, the wavelength of which ranges from a visible region to an infrared region; and a second process step of effecting irradiation of the radiation rays to said recording medium to carry out the radiation heating.

12 Claims, 4 Drawing Figures

IMAGE FORMING METHOD

This is a continuation of application Ser. No. 99,889, filed Dec. 3, 1979, which is a continuation of application Ser. No. 902,409, filed May 3, 1978, now abandoned.

BACKGROUND OF THE INVENTION

1. Field of the Invention

The present invention relates to an image forming method, and, more particularly, it is concerned with improvement in the so-called heat-sensitive recording method and electrosensitive recording method of heretofore known types so as to be adaptable to high speed recording system.

In recent years, facsimiles, printers, and the like have attained very remarkable development, and there have been proposed various systems for such facsimiles and printers. Of these various recording systems, thermal recording method (heat-sensitive recording method) or electric recording method (electro-sensitive recording method) are employed in many occasions as the recording means for the abovementioned facsimiles, printers, and so forth, because of various advantages they possess such as, for example: (1) use of primary color-forming recording material; (2) no need for maintenance over a fairly long period of time; (3) low cost in the recording material, hence easiness in its handling; (4) possibility in size-reduction of the recording apparatus; (5) noiseless recording operation due to its being non-impact process; and (6) possibility of obtaining the recording system including the apparatus per se at a low cost; and so on.

2. Description of the Prior Arts

The conventionally known heat-sensitive recording method can be largely divided into the following two kinds.

The first method is as shown in FIG. 1 of the accompanying drawing, in which an arbitrary image original 101 carrying thereon a heat-absorption pattern is closely contacted to a recording paper 105 consisting of a substrate 105 made of paper, plastic, and like other materials, and a heat-sensitive recording layer 102 formed by coating such heat-sensitive material on, or impregnating the same in, the substrate 103, after which the infrared ray is irradiated over the entire surface of the recording paper to cause the heat-sensitive composition in the recording layer 102 to react in accordance with the heat absorption pattern, thereby obtaining a color-formed image 104.

The second method is as shown in FIG. 2, in which a signal generated from a power source section 201 is first transmitted to a thermal head 202 through an electrical circuit (not shown), whereby a resistor contained in this thermal head 202 generates heat, and the thus generated heat is further transmitted to the heat-sensitive recording layer 204 to form therein an image 203 in accordance with the signal generated from the power source section 201. Incidentally, the constructions of the substrate 205 and the recording paper 206 are substantially the same as those shown in FIG. 1. Besides the abovementioned two methods, there has also been known such a heat-sensitive recording method, in which an image is formed in accordance with laser beam irradiation.

On the other hand, for the conventionally known electrosensitive recording method, there have been proposed various systems such as discharge destruction method, electrolytic method, method by using heat due to the electric current conduction, and so forth. In this specification, however, one example thereof will be explained in reference to FIG. 3. That is, as shown in this figure of drawing, a voltage is applied to a recording needle, or stylus, 302 in accordance with a recording voltage to be generated from the power source 301, whereby a closed circuit is formed in the following route: the power source 301→the recording stylus 302→the recording layer 304→the electrically conductive layer 305→a feedback electrode 303→the power source 301, through which electric current flows. By this current flow, the recording layer beneath the recording stylus 302 changes to form the image 306. The recording layer 304 consists, generally, of an electrically conductive agent which permits passage therethrough of electric current, a color forming agent, and a binding agent. It goes without saying that this kind of electro-sensitive recording method is not limited to the embodiment shown in FIG. 3. The present invention proposes, as its technical object, a method, in which image formation is effected by changes in the color former due to the Joule heat or electro-chemical reaction from electric current conduction. The electrically conductive layer 305 consists of an vapor-deposited metal layer, a thin metal layer, an electrically conductive carbon layer, or a semiconductive metal layer.

A serious disadvantage with the heat-sensitive recording method as has been explained in the foregoing is that its recording speed is very slow in comparison with other recording methods. For instance, the heat pulse which is usually used in the recording method in FIG. 2 is of an order of 10 m sec. to 20 m sec., and even a higher one is of an order of 5 to 6 m/sec. at most.

There are two reasons which can be pointed out for such difficulty in attaining the high speed recording in the conventional heat-sensitive recording method. The one is that, in spite of transmission loss in a heat signal being great, energy consumption unavoidably increases from the point of necessity for carrying out satisfactory image recording, and, in addition, heat-resistance of the thermal head, for example, is limited, on account of which the high speed recording is principally difficult. The second point is that there was not available such heat-sensitive recording material that has high sensitivity and satisfactory shelf life.

The same defects as mentioned above have also been pointed out with the electro-sensitive recording method. That is, according to the electro-sensitive recording method as illustrated in the drawing, continuous electric current conduction is required for a period of from application of an electric signal for the image formation to the formation of such desired image. In other words, the electric current conduction time ($t_o$) is substantially equal to the image forming time. If it is desired to form the image at a higher speed, the electric conduction time ($t_o$) can be shortened, in principle. As the result, however, the image density inevitably lowers to produce practically useless reproduction image. Therefore, even in such conventional electro-sensitive recording method, the high speed recording was a problem.

SUMMARY OF THE INVENTION

In view of the above-described disadvantages with the conventional image recording methods, it is a primary object of the present invention to provide an improved image forming method which solves various defects as pointed out with the known heat-sensitive recording method or electro-sensitive recording method, and which adds more advantages thereto.

It is another object of the present invention to provide an image forming method, in which thermal or electrical informations can be rendered visible at a high speed.

It is still another object of the present invention to provide an image forming method, in which thermal or electrical informations can be converted into a permanent visible image of good quality.

It is other object of the present invention to provide an image forming method, which produces a high quality image having high image contrast and being free from the background fogging by the use of a high speed information input.

In accordance with the present invention, there is provided an image forming method which comprises a first step, wherein thermal or electrical informations are introduced into a recording medium as an input thereto, and the thus introduced informations are converted into an absorption pattern of radiation rays, the wavelength of which ranges from a visible region to an infrared region; and the second step, wherein irradiation by the radiation rays is effected to the abovementioned recording medium to carry out heating by radiation.

The foregoing objects, other objects as well as specific construction and operations of the present invention will be more apparent and readily understandable from the following detailed description thereof, when read in conjunction with the accompanying drawing and preferred examples thereof.

DETAILED DESCRIPTION OF PREFERRED EMBODIMENTS

Figure 1:
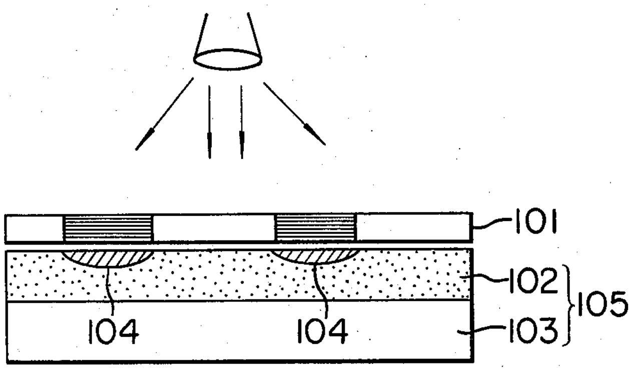
FIGS. 1 and 2 are respectively schematic diagrams for explaining the outline of the heat-sensitive recording method.
Figure 2:
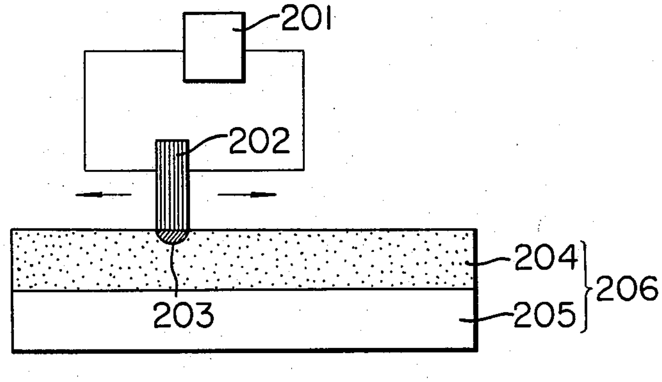
Figure 3:
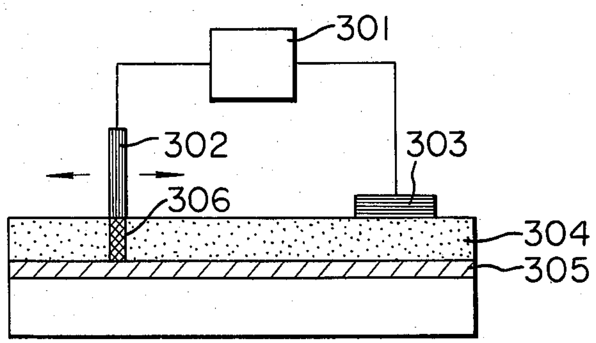
FIG. 3 is a schematic diagram for explaining the outline of the electro-sensitive recording method.

When a thermal information is to be recorded, the so-called heat-sensitive type recording medium is used, the structure of which is schematically shown in FIGS. 1 and 2. Also, when an electrical information is to be recorded, the so-called electro-sensitive type recording medium is used, the structure of which is schematically shown in FIG. 3. In more detail, the heat-sensitive type recording medium is so constructed that a recording layer is laminated on, or impregnated in, a base body or substrate made of a plastic film, etc.. The recording layer contains therein, besides a binder resin, etc., and image forming element which changes to have absorption capability of radiation rays (having its wavelength range from a visible region to an infrared region, in particular). Such image-forming element is selected from the below-listed compounds:

A multicomponent type heat-sensitive color-forming agent such as iron salts of long chain fatty acid (for example, ferric stearate and ferric myristate) and phenols (for example, tannic acid, gallic acid and ammonium salicylate); noble metal salts of organic acid (for example, silver behenate and silver stearate) and aromatic, organic reducing agents (for example, protocatecloric acid and hydroquinone); lactones (for example, crystal violet lactone) or fluorans (for example, 3-diethylamino-6-methyl-7-anilinofluoran) and phenols (for example, bisphenol A and phenolic resins); resorcin and nitroso compound; tetrazolium salt and reducing agent and base; and the like a thermal decomposition reaction composition type color-forming agent composed of combination of two or more substances which are rapidly thermally decomposed at a certain temperature to give a thermal decomposition product capable of causing color-forming reaction to take place, such as for example, amine-generating agent (for example, urea derivative) and PH indicator; amine-generating agent, diazo compound and coupler; substituted benzenediazoniumfluoborate, polyhydric phenol and nitroso compound; amine-generating agent and graphite fluoride, and the like; and an independent color-forming agent which is able to form a color independently under influence of heat to give a colored image, such as indol derivative, pyrrolone derivative, heavy metal salt of substituted aminodithioformic acid and the like.

These image-forming elements should preferably cause visible change to occur by a thermal reaction so as to possess an absorption band in the radiation rays such as visible light, infrared light, etc.. Further, such image-forming element has a property of increasing its visible reflection density by the radiation heating.

Also, in the present invention, it is possible to provide an intermediate layer of different kind between the substrate and the heat-sensitive recording layer, as another example of constructing the heat-sensitive recording medium. This intermediate layer consists, for example, of a thin metal layer or a layer of composition of a resin and a pigment having its absorption band in the near infrared region, and has an effect of intercepting the radiation rays. If it has a low heat conductivity, the density amplification of the visible image to be formed in accordance with the information input can be done effectively, as will be described in detail later, hence it can be a preferable embodiment for the purpose of the present invention.

The so-called electro-sensitive type recording medium for use in the present invention is of such a construction that an electrically conductive recording layer is provided on an electrically conductive substrate such as, for example, metal-deposited paper, metal-laminated paper, carbon-treated paper, etc.. The electrically conductive recording layer is composed of an electrically conductive agent and a binding agent to be enumerated herebelow, and, further an image-forming element consisting of one or more kinds of color-forming agent to be classified hereinbelow.

For such image forming element, those which change color so as to have an absorption band of visible light and infrared light are desirable.

In the following, examples of the electrically conductive agent, the binding agent, and the color-forming agent are enumerated in classification.

1. Electrically Conductive Agent

(1) Semiconductors of metal oxide

Zinc oxide, indium oxide, stannic oxide and the like.

(2) Zeolites

Analcite, fanjasite, chabazite, sodalite, molecular sieves (A, X, Y and SK type synthesized zeolites) and the like.

(3) Electrically conductive high molecular sustances

Sodium polyacrylate, quaternary salt of polyethyleneimine, polyvinyl-trimethylbenzylammonium chloride (ECR-34, trade name for a product of Daw Chemical Co.), sulfonated polystyrene salt (Oligo Z, trade name for a product of Tomoegawn Paper Mfg. Co., Ltd) and the like.

(4) Metal halides

Cuprous iodide and the like.

(5) Inorganic electrolytes

Lithium chloride, sodium chloride, magnesium sulfate and the like.

2. Binding Agent

Natural or synthesized resins such as polyvinyl alcohol, casein, starch, methyl cellulose, ethyl cellulose, acrylic resin, styrene-butadiene latex, polyvinyl butyral and the like.

3. Color-forming Agent (1) Heat-sensitive color-forming agents

Combinations of leuco dye and acid substance. The leuco dye includes for example, 3,3-bis(p-dimethylaminophenyl)-6-dimethylamino-phthalide (crystal violet lactone) and 3-diethylamino-6-methyl-7-anilinofluoran. The acid substance includes for example, 4,4'-isopropylidenediphenol (bisphenol A), stearic acid and succinic acid.

(2) Electrolytic color-forming agent

Combination of potassium iodide and starch, combination of aromatic primary amine hydrochloride, sodium nitrite and phenol derivative, indicators such as phenolphthalein, Bromophenol Blue and the like.

(3) Reduction color-forming agent

Tetrazolium salts such as triphenyltetrazolium chloride, blue tetrazolium chloride and the like; metal oxides such as zinc oxide, molybdenum trioxide, tungsten trioxide and the like; heteropoly-acid salt such as phosphomolybdate, phosphotungstate and the like.

(4) Oxidation color-forming agent

Leuco dyes such as leuco indigo, benzoyl leucomethylene blue and the like.

In addition, as the electrically conductive substrate used in the present invention, there may be mentioned aluminum-deposited Mylar, aluminum-deposited paper, aluminum-laminated paper, electrically conductive carbon-coated paper, metal plate, electrically conductive paper containing electrolyte and the like.

In the present invention, when an image information is introduced into the recording medium as detailed in the foregoing in the form of heat or electric current, the quantity of energy required to be applied in the first process step (hereinafter called "process step A") can be smaller than that used in the conventional recording operation. For example, heat pulse to be applied to the recording medium from the thermal head, as the thermal information, can be arbitrarily selected from a range of from 0.05 m sec. to 1 m sec. Also, a required time for electric current conduction from the stylus, which is introduced as an input electrical information to the recording medium, may be in the range of from about 10 μsec. to 100 μsec. It should, however, be understood that the abovementioned numerical values are not absolute, since these input informations are governed by the transfer efficiency thereof into the recording medium.

Figure 4:
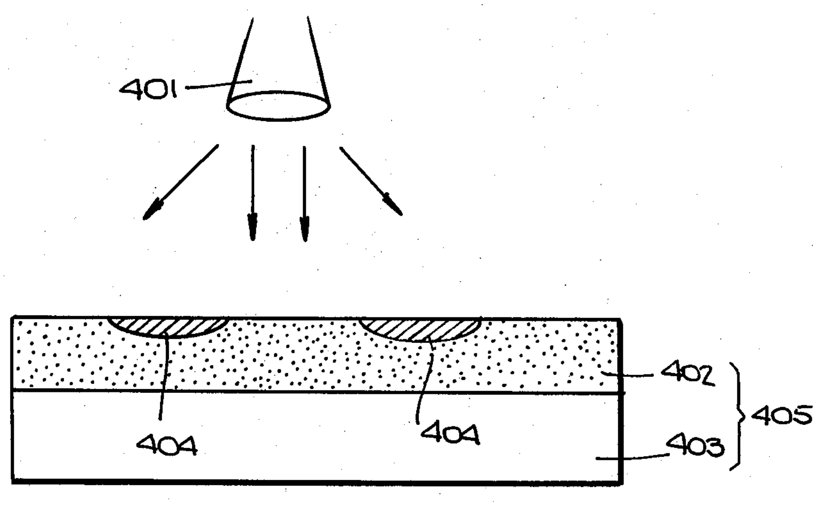
FIG. 4 is a schematic diagram which illustrates the irradiation of a recorded visible image according to the present invention.

In the process step A according to the present invention, there is formed an absorption pattern of the radiation rays, whose wavelength range is from the visible region to the infrared regin, at the information input portion in the recording medium. While this absorption pattern is not so sufficient in its density, it still has a visible contrast with respect to the background portion. Simultaneously with, or subsequent to, formation of the absorption pattern of the radiation rays in the process step A, there is effected a selective heat absorption at the pattern portion by the radiation heating of the recording medium, in consequence of which the image-forming element previously contained in the recording layer of the recording medium develops color, and the image appears with increase in density of the pattern portion. In this second step (hereinafter referred to as "process step B"), the heat absorption is very small at a portion other than the pattern portion, hence the density increase takes place scarcely. FIG. 4 schematically illustrates this step. Specifically, a recording member 405 is shown which comprises a substrate 403 and a recording layer 402 thereon, the latter having a visible image 404 therein being irradiated by irradiation source 401.

Thus, according to the present invention, since the energy quantity to be given as the thermal or electrical information can be much less than the energy of the conventional image signal, the image formation can be done at a higher speed than in the conventional heat-sensitive or electro-sensitive recording method. In addition to the high speed operation, since the quantity of the information energy is small, there accrues such an advantage that, for example, fatigue in the thermal head during the heating and cooling cycle is reduced, and the service life of the thermal head can be prolonged. Such small quantity of the information energy has further yielded various advantages such that fusion-bonding of the components in the recording layer to the thermal head, image original, and so forth becomes remarkably reduced, whereby deterioration in the resulted image quality, contamination of the image original, and so forth can be well prevented. Besides these, there have also been found out new advantages which were not seen in the conventional electro-sensitive recording method such that, since the electric current conduction needs not be continued until the image formation completes, adhesion of dust to the recording stylus due to fusion of the recording layer can be prevented, and the image quality further improves, and that wear of the recording stylus caused by sparks etc. to occur during the electric current conduction can be remarkably reduced.

For the thermal information applying means for use in the process step A of the present invention, various kinds of thermal heads such as, for example, the so-called "thin film" head which has a resistance body formed by the vapor deposition, a "thick film" head which has a resistance body formed by the screen printing, and like other methods, and a semiconductor head which has a resistance body formed by the semiconductor fabricating methods. Besides these thermal heads, there can also be used an infrared ray lamp, $CO_2$ gas laser, and so on.

The electrical informations can be introduced into the recording medium, as the input thereto, in the form of a current or a high frequency signal through the recording stylus.

For the expedients that can be used in the process step B of the present invention, there are a flash light source such as, for example, xenon flash light, halogen flash light, etc., an infrared ray lamp such as a tungsten lamp, etc., and a laser light source such as carbon dioxide gas laser, semiconductor laser, and argon gas laser. Such light source should preferably be able to irradiate, before the fogging takes place at the portion other than the pattern to be formed in the process step A, the radiation rays of high intensity, the wave-length of which coincides with that of the absorption band of the pattern as far as possible. From this standpoint, the flash light source and the laser light source can be said desirable.

The process steps A and B in the present invention should preferably be carried out in the following two ways. The one is such that both A and B process steps are effected substantially simultaneously, and the other is that the process step B is carried out after completion of the process step A. When the former is adopted, the desired image formation can be effected within a short period of time. On the other hand, when the latter is used, the process step B can be done over a large area, which is another convenience.

With a view to understanding more clearly the present invention and its effect, the following preferred examples are presented, although the scope of the invention is not limited to these examples alone. It should further be understood that the reference to the unit in "part" as used in these examples is "by weight" unless otherwise indicated.

EXAMPLE 1

The following heat-sensitive composition was coated on high quality paper, and dried to obtain the recording medium.

| | |
|---|---|
| 3-diethylamino-6-methyl-7-anilinofluoran | 1 part |
| bisphenol A | 3 part |
| polyvinyl alcohol | 0.4 part |
| water | 4 part |

A thin film head with tantalum nitride as the resistance body was contacted onto the recording paper, and various heat pulses as listed in the following Table 1 were applied thereto as the process step A (Applied energy: 25 mJ/mm$^2$). Subsequently, xenon flash light (7 J/cm$^2$) was irradiated onto the recording paper for 1 m sec. by the use of "Xenofax FX-150" (product of Riso Kagakusha Co., Japan) as the process step B. The results show remarkable increase in the image density as seen from the same Table.

TABLE 1

| Applied Pulse Width (m sec.) | Image Density After Process step A (*) (DA) | Image Density After Process step B (*) (DB) |
|---|---|---|
| 0/i.e. blank | 0.13 | 0.14 |
| 0.10 | 0.17 | 0.69 |
| 0.20 | 0.19 | 0.72 |
| 0.50 | 0.21 | 0.73 |
| 0.70 | 0.22 | 0.76 |
| 1 | 0.23 | 0.78 |

(NOTE)
The image density with asterisk mark (*) (in the case of a blank, it is the background density) is denoted by reflection density value. The same applies to the density values in the subsequent Examples 2 to 12.

EXAMPLE 2

The following heat-sensitive composition was coated on a "Mylar" film of 50 μm thick, and dried to obtain the recording sheet. ("Mylar" is a trademark for a polyester film produced by E. I. du Pont de Nemours & Co., U.S.A.)

| | |
|---|---|
| ferric stearate | 2 parts |
| protocatechnic acid | 4 parts |
| polyvinyl butyral | 10 parts |
| ethanol | 90 parts |

A thin film head with tantalum nitride as a resistance body was contacted onto the recording sheet, and various heat pulses as listed in the following Table 2 were applied thereto as the process step A (Applied energy: 25 mJ/mm$^2$). Subsequently, carbon dioxide gas laser (output 10 W, irradiation time 10 m sec.) was irradiated onto the recording sheet as the process step B. The results show remarkable increase in the image density as seen from the same Table 2.

TABLE 2

| Pulse Width Applied to Head (m sec) | Image Density After Process Step A | Image Density After Process step B |
|---|---|---|
| 1 | 0.21 | 0.72 |
| 2 | 0.25 | 0.79 |
| 6 | 0.43 | 0.96 |
| 10 | 0.95 | 1.05 |

EXAMPLE 3

A photographic image original of 75 μm thick was closely contacted onto the same recording paper as obtained in Example 1 above, both of which were passed beneath an infrared ray lamp (tungsten lamp of 300 W) to effect the process step A. After the image original was removed from the recording paper, further irradiation of the recording paper was conducted with xenon flash light (7 J/cm$^2$) for 1 m sec. There could be recognized increase in the image density as indicated in the following Table 3.

TABLE 3

| Passing Speed of Recording Paper (cm/sec) | Image Density After Process Step A | Image Density After Process Step B |
|---|---|---|
| 10 | 0.23 | 0.75 |
| 6 | 0.32 | 0.80 |
| 4 | 0.55 | 0.90 |
| 2 | 1.0 | 1.1 |

EXAMPLE 4

The same heat-sensitive composition as that of Example 1 above was coated in a thickness of about 10 μm on a vapor-deposited paper having on its base a vapor-deposited layer of aluminum in a thickness of 600 to 700 angstroms, thereby obtaining a recording paper. To this recording paper, there was contacted a thin film head with tantalum nitride as the resistance body, and various heat pulses as shown in the following Table 4 were applied as the process step A (Applied energy: 25 mJ/mm$^2$). Then, xenon flash light (4 J/cm$^2$) was irradiated onto this recording paper for 1 m sec. to effect the process step B. Increase in the image density could be observed with good efficiency as will be seen from the same Table 4.

TABLE 4

| Pulse Width Applied to Head (m sec) | Image Density After Process Step A | Image Density After Process Step B |
|---|---|---|
| 0.20 | 0.21 | 0.73 |
| 0.50 | 0.22 | 0.78 |
| 1 | 0.32 | 0.85 |
| 3 | 0.48 | 0.92 |

EXAMPLE 5

The following composition was coated on high quality paper in a thickness of 5 microns (after drying) to form an intermediate layer.

| | |
|---|---|
| Phosphomolybdic acid | 1.0 part |
| L-ascorbic acid | 0.3 part |
| polyvinyl butyral | 5.0 part |
| ethanol | 45.0 part |

On this intermediate layer, the same heat-sensitive composition as that of Example 1 was coated and dried to obtain a recording medium. Using an argon laser (output 10 mW), the recording medium was subjected to scanning at various speeds shown in the following Table 5 to perform the process step A. Subsequently, xenon flash light (4 J/cm$^2$, irradiation time 1 m sec.) was irradiated onto the recording sheet to perform the process step B. Increase in the image density could be observed as shown in the same Table 5.

TABLE 5

| Laser Scanning Speed (cm/sec) | Image Density After Process Step A | Image Density After Process Step B |
|---|---|---|
| 30 | 0.30 | 0.81 |
| 20 | 0.40 | 0.87 |
| 10 | 0.50 | 0.98 |
| 5 | 0.90 | 1.05 |

On the other hand, the same recording operation as mentioned above were conducted on a recording medium obtained by coating the same heat-sensitive composition as that of Example 1 directly onto the high quality paper without the intermediate layer. The results were as shown in the following Table 6.

TABLE 6

| Laser Scanning Speed (cm/sec.) | Image Density After Process Step A | Image Density After Process Step B |
|---|---|---|
| 30 | 0.24 | 0.61 |
| 20 | 0.36 | 0.69 |
| 10 | 0.45 | 0.82 |
| 5 | 0.82 | 0.95 |

From the foregoing results, it will be seen that increase in the image density can be done efficiently when the intermediate layer is present in the recording medium.

EXAMPLE 6

The following heat-sensitive composition was coated on a "Mylar" film of 50 μm thick with a coating bar to a thickness of 5 microns, and dried to obtain a recording sheet.

| | |
|---|---|
| 3-diethylamino-6-methyl-7-anilinofluoran | 1.0 part |
| 2,2-bis(4-hydroxyphenyl)n-heptane | 4.0 part |
| polyvinyl alcohol | 0.5 part |
| water | 7.5 part |

To this recording sheet, there was contacted a thin film heat-sensitive head with tantalum nitride as the resistance body, and then, various heat pulses as listed in the following Table 7 were applied to the recording sheet as the process step A (Applied energy: 25 mJ/mm$^2$). Further, xenon flash light (5 J/cm$^2$, irradiation time 10 m sec.) was irradiated from the opposite side of the thermal head as the process step B. As the result of the process step B, there could be observed increase in the image density as shown in the same Table 7.

TABLE 7

| Pulse Width Applied to Head (m sec.) | Image Density by Process Step A Alone | Image Density by Process Steps A and B |
|---|---|---|
| 0.20 | 0.17 | 0.65 |
| 0.50 | 0.19 | 0.68 |
| 1 | 0.21 | 0.69 |
| 2 | 0.27 | 0.78 |
| 5 | 0.38 | 0.88 |

EXAMPLE 7

The following two kinds of components (A) and (B) were mixed in a separate ball mill for two days. After the mixing, 20 parts of the liquid (A) and 30 parts of the liquid (B) were admixed to prepare a coating composition for the recording layer.

| | |
|---|---|
| Liquid (A) | |
| zinc oxide ("Ginrei No. 2" produced by Toho Zinc Co. Ltd., Japan) | 50 parts |
| 3-diethylamino-6-methyl-7-anilinofluoran | 16 parts |
| polyvinyl alcohol (10% aqueous solution) | 90 parts |
| water | 45 parts |
| Liquid (B) | |
| zinc oxide ("Ginrei No. 2" produced by Toho Zinc Co. Ltd., Japan) | 50 parts |
| bisphenol | 45 parts |
| polyvinyl alcohol (10% aqueous solution) | 140 parts |
| water | 65 parts |

The thus obtained coating material was applied onto paper with aluminum vapor-deposited thereon by the use of a coating rod bar to a thickness of 14 microns, and dried with hot air of approximately 70° C. thereby obtaining electro-sensitive recording paper.

Then, a tungsten stylus of 0.2 mm in diameter was contacted onto the surface of the recording layer of this recording paper under a pressure of 10 g/cm$^2$, and direct current voltage of −150 volts was applied for 20 μsec. across the stylus and the aluminum deposited layer, whereupon 2 mA of electric current flow therethrough, and a mark in light color was recorded on the paper in a diameter of 0.2 mm. The optical reflection density of this mark was 0.2.

Subsequently, when xenon flash light was irradiated onto this recording paper, on which the recording operation had been performed, for 1/1000 second by the use of "Xenofax FX-150" (product of Riso Kagakusha, Co., Japan), the density of the recorded mark increased from 0.2 to 1.01, and satisfactory black mark could be obtained. There was no change in the background density.

EXAMPLE 8

A recording paper same as that of Example 7 was prepared. After a mark having an image density of 0.2 was formed on this recording paper by the electro-sensitive recording operation same as that in Example 7, it was exposed for 3 seconds to a tungsten infrared ray lamp ("Thermofax" produced by 3M Co. Ltd., Japan). The image density increased at the portion of the recorded mark alone from 0.2 to 0.7, whereby a satisfactory black mark hving sufficient image contrast to the background was obtained.

EXAMPLE 9

The following respective components (C), (D) and (E) were crushed and well mixed in a separate ball mill for two days, thereby obtaining slurries.

| | |
|---|---|
| Liquid (C) | |
| Molecular sieve SK-40 (synthetic zeolite produced by Union Carbide Corp., U.S.A.) | 100 parts |
| 3,3-bis(p-dimethylaminophthalide 6-dimethylaminophthalide (crystal violet lactone) | 15 parts |
| water | 85 parts |
| Liquid (D) | |
| molecular sieve SK-40 (synthetic zeolite produced by Union Carbide Corp., U.S.A.) | 100 parts |
| bisphenol A | 45 parts |
| water | 55 parts |
| Liquid (E) | |
| Molecular sieve SK-40 (synthetic zeolite produced by Union Carbide Corp., U.S.A.) | 100 parts |
| molybdenum trioxide | 50 parts |
| water | 50 parts |

Then, 20 parts of the liquid (C), 20 parts of the liquid (D), and 20 parts of the liquid (E) were well mixed together in the presence of 15 parts of 20% aqueous solution containing therein casein and starch at a ratio of 1:1, thereby obtaining coating material for the recording layer. This coating material was applied onto the aluminum deposited paper same as in Example 7 to obtain the recording paper.

A tungsten stylus of 0.2 mm in diameter was contacted to the recording paper with the stylus being connected to the negative polarity of the d.c. power source and the aluminum deposited layer of the paper to the positive polarity thereof, and a voltage of 200 V was applied across the stylus and the aluminum deposited layer for 20 μsec. As the result, there could be obtained on the recording paper a recorded mark having a reflection density of 0.25 and corresponding in size to the diameter of the tungsten stylus. Next, xenon flash light was irradiated onto this recording paper for 1/1000 second using "Xenofax FX-150" of Riso Kagakusha Co., Japan, whereupon the recorded mark portion alone selectively increased the image density, and a satisfactory blue colored mark having the reflection density of 0.99 could thus be obtained.

EXAMPLE 10

The following components were crushed and mixed in a ball mill for two days to thereby obtain a coating material for the recording layer.

| | |
|---|---|
| molecular sieve 13X (synthetic zeolite produced by Union Carbide Corp., U.S.A.) | 10 parts |
| molybdenum frioxide | 2 parts |
| ammonium nolybdate | 4 parts |
| lithium chloride | 3 parts |
| polyvinyl alcohol (10% aqueous solution) | 18 parts |
| water | 13 parts |

This coating material was impregnated in untreated paper of 65 microns thick and 50 g/m$^2$ in weight to obtain a recording paper.

An aluminum plate was applied onto one surface of the recording paper, and a tungsten stylus of 0.2 mm in diameter was contacted onto the other surface thereof under a pressure of 10 g/cm$^2$. Then, a voltage of 300 V was applied thereacross for 10μ sec. with the aluminum plate as the positive polarity and the stylus as the negative polarity, whereupon electric current of 5 mA passed through the recording paper and a mark of a size corresponding to the diameter of the tungsten stylus was recorded thereon with a reflection density of 0.30. Subsequently, when xenon flash light was irradiated on this recording paper for 1/1000 second with use of "Xenofax FX-150" produced by Riso Kagakusha, Co., Japan, the marked portion alone selectively increased its density and a satisfactory black mark was obtained. The image density of this mark was 1.20.

EXAMPLE 11

A high frequency signal (40 Mc, 200 V) was applied to a very small portion of the recording layer in the recording paper prepared in Example 9 for 10μ sec., whereupon a mark having an image density of 0.23 was recorded thereon. Subsequently, when the recording paper was exposed to xenon flash light for 1/1000 second (flash device used is "Xenofax FX-150" of Riso Kagakusha Co., Japan), the marked portion alone selectively increased the image density, whereby a blue colored mark having a reflection density of 0.85 could be obtained.

EXAMPLE 12

The coating material for the recording layer which had been prepared in the same manner as in Example 7 above was coated to a thickness of 10 microns on an aluminum deposited "Mylar" film with use of a coating rod bar. The thus obtained recording medium was subjected to a voltage application for 20μ sec. with a d.c. voltage of −130 V in the same manner as in Example 7.

Simultaneously with this voltage application, light from a 500 W tungsten infrared lamp was irradiated onto this recording medium from the back side thereof for one second. A mark in black having an image density of 0.98 was recorded thereon.

When no tungsten infrared lamp light was irradiated onto this recording medium, the reflection density of the recorded mark was only 0.22.

COMPARATIVE EXAMPLE

It was found that, in order to obtain an image having the color-forming density of 1.0 and above by the recording operation due to the initial electrical signal alone and without effecting the flash light irradiation onto the recording paper obtained in the same manner as in Example 7, a voltage of −150 V was required to be applied to the recording stylus for 600μ sec. or longer. The current flow at this time was 15 mA and above.

What we claim is:

1. A high speed image forming method comprising the steps of:

(a) forming a visible image at high speed in a heat-sensitive recording medium by imagewise exposing said recording medium with low energy radiant thermal information to thereby form said visible image and a non-image portion, said visible image having a visible contrast with respect to said non-image portion and being capable of absorbing radiation rays, the wavelength of which ranges from the visible to the infrared region; and (b) irradiating said recording medium with said radiation rays, whereby said visible image absorbs more radiation than said non-image portion to thereby selectively increase the optical density of said visible image relative to the optical density of said non-image portion.

2. The image forming method as claimed in claim 1, wherein said process steps (a) and (b) are carried out substantially simultaneously.

3. The image forming method as claimed in claim 1, wherein said process step (b) is effected subsequent to said process step (a).

4. The image forming method as claimed in claim 1, wherein the radiation rays in the process step (b) have wavelengths principally ranging from a visible region to a near infrared region.

5. The image forming method as claimed in claim 1, wherein the required time for thermal information input in said process step (a) is in a range of from 0.05 millisecond to 1 millisecond.

6. The image forming method as claimed in claim 1, wherein the thermal information is given by heated conduction.

7. The image forming method as claimed in claim 1, wherein said thermal information is given by radiation.

8. The image forming method as claimed in claim 1, wherein an increase in reflection density takes place only at the visible image portion.

9. The image forming method as claimed in claim 1, wherein said recording medium comprises a substrate, a recording layer and on intermediate layer provided between the substrate and recording layer, said intermediate layer having an intercepting effect of the radiation rays and low thermal conductivity.

10. The image forming method as claimed in claim 9, wherein said intermediate layer comprises a thin metal layer.

11. The image forming method as claimed in claim 9, wherein said intermediate layer comprises aluminum.

12. The image forming method as claimed in claim 9, wherein said intermediate layer comprises a resin and a pigment having its absorption band in the near infrared region.

* * * * *

UNITED STATES PATENT AND TRADEMARK OFFICE

CERTIFICATE OF CORRECTION

PATENT NO. : 4,392,141

DATED : July 5, 1983

INVENTOR(S) : EIICHE INOUE, ET AL

It is certified that error appears in the above-identified patent and that said Letters Patent is hereby corrected as shown below:

Column 3, line 13, change "other" to -- another --

Column 3, line 57, change "and" to -- an --

Column 4, line 8, after "of" insert -- a --

Column 5, line 12, change "Tomoegawn" to -- Tomoegawa --

Column 6, line 13, change "regin" to -- region --

Column 9, line 58, change "were" to -- was --

Column 11, line 29, change "hving" to -- having --

Column 11, lines 41-42, change "3,3-bis(p-dimethylaminophthalide 6-dimethylaminophthalide" to -- 3,3-bis(p-dimethylamino-phenol-6-dimethylaminophthalide --

Column 12, line 23, change "nolybdate" to -- molybdate --

Signed and Sealed this

*Twenty-first* Day of *February 1984*

[SEAL]

*Attest:*

GERALD J. MOSSINGHOFF

*Attesting Officer* *Commissioner of Patents and Trademarks*